(12) United States Patent
Govari

(10) Patent No.: US 12,551,724 B2
(45) Date of Patent: Feb. 17, 2026

(54) FACILITATING ABLATIVE RADIOTHERAPY USING AN INTRABODY CATHETER

(71) Applicant: Biosense Webster (Israel) Ltd., Yokneam (IL)

(72) Inventor: Assaf Govari, Haifa (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 547 days.

(21) Appl. No.: 18/089,713

(22) Filed: Dec. 28, 2022

(65) Prior Publication Data

US 2024/0216714 A1 Jul. 4, 2024

(51) Int. Cl.
| | |
|---|---|
| *A61N 5/10* | (2006.01) |
| *A61B 18/00* | (2006.01) |
| *A61M 25/01* | (2006.01) |

(52) U.S. Cl.
CPC ......... *A61N 5/1049* (2013.01); *A61N 5/1071* (2013.01); *A61N 5/1077* (2013.01); *A61B 2018/00357* (2013.01); *A61B 2018/00577* (2013.01); *A61M 25/0127* (2013.01)

(58) Field of Classification Search
CPC .. A61N 5/1049; A61N 5/1071; A61N 5/1077; A61N 2018/00357; A61M 25/0127
See application file for complete search history.

(56) References Cited

U.S. PATENT DOCUMENTS

| | | | |
|---|---|---|---|
| 5,391,199 A | 2/1995 | Ben-Haim | |
| 5,443,489 A | 8/1995 | Ben-Haim | |
| 5,558,091 A | 9/1996 | Acker et al. | |
| 6,032,067 A | 2/2000 | Sjoholm | |
| 6,172,499 B1 | 1/2001 | Ashe | |
| 6,239,724 B1 | 5/2001 | Doron et al. | |
| 6,332,089 B1 | 12/2001 | Acker et al. | |
| 6,484,118 B1 | 11/2002 | Govari | |
| 6,618,612 B1 | 9/2003 | Acker et al. | |
| 6,690,963 B2 | 2/2004 | Ben-Haim et al. | |
| 6,788,967 B2 | 9/2004 | Ben-Haim et al. | |
| 6,892,091 B1 | 5/2005 | Ben-Haim et al. | |
| 7,536,218 B2 | 5/2009 | Govari et al. | |

(Continued)

FOREIGN PATENT DOCUMENTS

EP 1658818 A1 5/2006

OTHER PUBLICATIONS

Kim, Eun-Jeong et al. "Non-invasive Cardiac Radiation for Ablation of Ventricular Tachycardia: a New Therapeutic Paradigm in Electrophysiology." Arrhythmia & electrophysiology review vol. 7,1 (2018): 8-10. doi:10.15420/aer.7.1.EO1.

*Primary Examiner* — David E Smith
(74) *Attorney, Agent, or Firm* — Clayton, McKay & Bailey, PC

(57) ABSTRACT

A method for performing ablative radiotherapy includes registering a first coordinate system of a tracking system for tracking a distal end of an intra-body catheter with a second coordinate system of a beam-directing system, tracking the location of a distal end of the catheter, receiving instructions from a user to ablate target tissue within the body with the beam-directing system and based on the registration and the tracking, aiming the beam-directing system at the target tissue so as to facilitate directing the therapeutic beams of radiation at the target tissue.

14 Claims, 4 Drawing Sheets

(56) References Cited

U.S. PATENT DOCUMENTS

| | | |
|---|---|---|
| 7,657,302 B2 | 2/2010 | Mate et al. |
| 7,756,576 B2 | 7/2010 | Levin |
| 7,848,787 B2 | 12/2010 | Osadchy |
| 7,869,865 B2 | 1/2011 | Govari et al. |
| 8,456,182 B2 | 6/2013 | Bar-Tal et al. |
| 2013/0131425 A1* | 5/2013 | Sumanaweera ...... A61N 5/1037 600/1 |
| 2019/0328482 A1* | 10/2019 | Izmirli ................ A61B 6/0492 |
| 2023/0157751 A1* | 5/2023 | Harlev .................. A61B 34/10 600/424 |
| 2024/0423709 A1* | 12/2024 | Kaiser .................. A61B 8/488 |

* cited by examiner

FACILITATING ABLATIVE RADIOTHERAPY USING AN INTRABODY CATHETER

FIELD OF THE DISCLOSURE

The present disclosure is related to cardiac ablation therapy and more specifically to radiotherapy for cardiac ablation.

BACKGROUND

Catheter ablation is a well-known method for treating arrythmias. During catheter ablation, a physician positions a distal end of a catheter at a target location on heart's muscular wall and delivers ablation energy through the catheter to that target location. Prior to performing the ablation, the physician will typically construct an electro-anatomical (EA) model of the heart chamber. The EA model may be constructed using for example a diagnostic catheter that is configured to sense the heart's electrical activity at different locations along the heart's muscular wall. Once defined, the EA model is typically rendered to a display and used by the physician to select the target location as well as monitor the ablation process.

Recently, radiotherapy has been suggested as an alternative approach for ablating target tissue for the treatment of ventricular arrhythmias. An advantage of ablative radiotherapy, is that provides a non-invasive method to ablate target tissue within the body of the patient. However, this non-invasive treatment may still require first constructing an EA model of the heart chamber based on a catheter procedure.

Kim, Eun-Jeong, et al., in an article entitled "Non-invasive cardiac radiation for ablation of ventricular tachycardia: a new therapeutic paradigm in electrophysiology," published in Arrhythmia & Electrophysiology Review 7.1 (2018): 8 describes non-invasive ablation of cardiac tissue to control ventricular tachycardia (VT). The technique involves the use of stereotactic radiotherapy delivered to VT substrates.

It is suggested to use electrocardiographic imaging (ECGI) to obtained detailed electrophysiological information from the body-surface recordings without requiring catheterization. The abnormal areas of myocardium defined by ECGI can be correlated with areas of scar identified with magnetic resonance imaging (MRI) or single-photon emission computed tomography (CT). However, a limitation of this approach is that ECGI provides information largely about the epicardial depolarization and repolarization of the heart, but the arrhythmia substrate is often endocardial or intramural.

BRIEF DESCRIPTION OF THE DRAWINGS

The present disclosure will be more fully understood from the following detailed description of examples thereof, taken together with the drawings, in which.

DETAILED DESCRIPTION OF EXAMPLES

Overview

Figure 1:
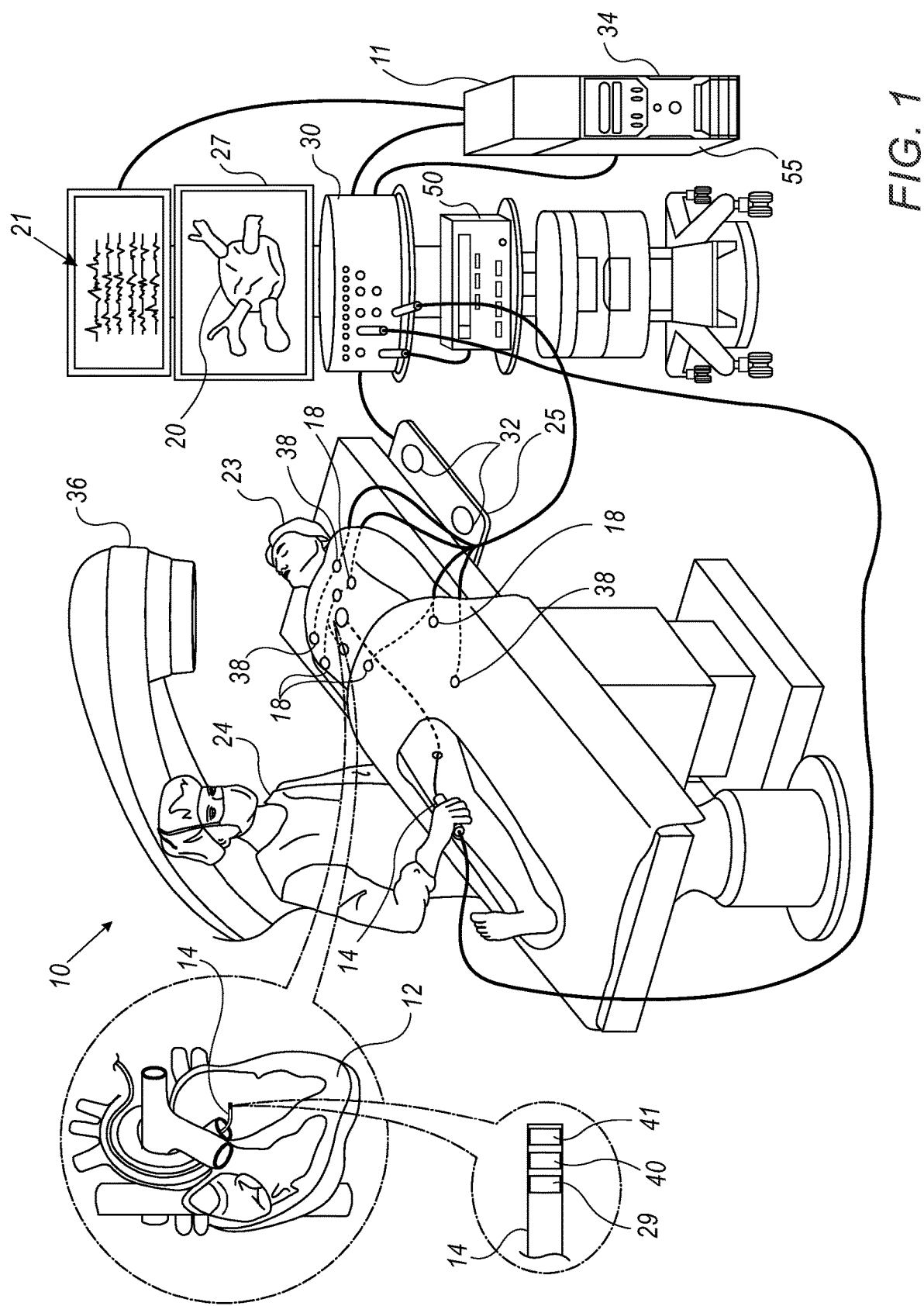
FIG. 1 is a schematic illustration of an example electrophysiology mapping and radiotherapy system, in accordance with some examples of the present disclosure.

When performing ablative radiotherapy, care must be taken to clearly identify the target tissue that is causing the arrhythmia so as not to irradiate tissue that is not targeted for ablation. Presently, an EA map constructed based on a catheter procedure may provide the most comprehensive information for identifying the target tissue. One of the advantages of using catheterization to collect data for constructing the EA map is that the data may be captured along the endocardium. Optionally, catheterization may also be used to collect data from the pericardium. Another challenging is performing ablative radiotherapy for cardiac ablation is achieving sufficient accuracy when directing the therapeutic beams of radiation to the target location. A small error in beam orientation may lead to a significant error in the location at which the beam impinges on the cardiac wall. The inherent movement due to breathing motion and the beating of the heart may add a further challenge in properly aligning the beam to reach the target location.

Hence, to improve the accuracy and ensure that the radiation beam is properly aligned, examples of the present disclosure utilize an intrabody catheter to help guide the beam to a target location and/or to check that the beam is not significantly affecting an area or volume at which ablation is to be avoided, e.g. esophagus or phrenic nerve. Since catheterization may be used for constructing the EA map in preparation for ablation, the catheter inserted to guide the radiation beam may be inserted through a same incision and therefore may not be associated with any added risk for the procedure.

It is also noted, that the present applicant have found that radiotherapy ablation guided with a catheter may provide a safer alternative to catheter ablation. One of the drawbacks of catheter ablation is the size and relatively rigidity of an ablation catheter as compared to a diagnostic catheter and/or a catheter as described herein for guiding radiotherapy ablation. The relatively large size and rigidity may potentially cause damage when navigating through the circulatory system and heart chamber.

The present applicant has also found that radiotherapy ablation guided with a catheter may be advantageous for treating different types of arrythmias including for example atrial and ventricular arrythmias.

In some examples, the distal end of the catheter is tracked by a tracking system, the coordinate system of which is registered to the coordinate system of the beam-directing system that delivers the beams of radiation. For example, the distal end of the catheter may comprise an electromagnetic sensor, which generates a location-indicating signal in the presence of a magnetic field. Advantageously, due to the real-time precision (e.g., to within 1 mm) of the tracking system, the tracking system may guide the beams to the correct target locations.

Prior to the procedure, the tracking system may be used to generate an EA map, and one or more target locations may then be defined with reference to the map. Alternatively or additionally, the definition of the target locations may be performed with reference to an image acquired with a modality such magnetic resonance imaging (MRI), computed tomography (CT), or intracardiac echocardiography (ICE), such as 4D ICE.

In some examples, the distal end of the catheter is positioned at the target tissue. Based on the tracking and on the registration, a processor continually computes the coordinates of the distal end of the catheter in the coordinate system of the beam-directing system. In parallel, the processor aims the beam-directing system at the computed coordinates for the delivery of the radiation beams. Thus, advantageously, the beams may impinge on the target tissue even as the target tissue moves.

In such examples, for extra assurance, the distal end of the catheter may be equipped with a radiation sensor. Prior to aiming the beam-directing system for the delivery of the therapeutic beams, the processor may instruct the beam-directing system to direct a test beam of radiation, which is less intense than the therapeutic beams, at the coordinates of the distal end. The processor may then verify that the amount of radiation sensed by the radiation sensor exceeds a predefined threshold amount. Thus, another advantage of the present disclosure is the improved accuracy provided by use of the radiation sensor to verify the proper positioning of the beam.

Alternatively or additionally, the distal end of the catheter may be equipped with a contact sensor, which may comprise, for example, an electrode, a pair of electrodes, or a pressure sensor. Prior to aiming the beam-directing system for the delivery of the therapeutic beams, the processor may verify that the contact sensor is in contact with tissue of the patient, such that, by directing the therapeutic beams at the coordinates of the distal end of the catheter, the target tissue may be irradiated.

In other examples, the distal end of the catheter is positioned at a distance from the target tissue, typically at other tissue that is particularly sensitive to the radiation. For example, during a cardiac ablation, the distal end of the catheter may be positioned in the esophagus. In such examples, prior to aiming the beam-directing system at the target coordinates, i.e., the coordinates of the target tissue that were calculated by the processor, the processor may verify that a therapeutic beam directed at the target coordinates would not impinge on the distal end of the catheter.

For example, after computing the coordinates of the distal end of the catheter in the coordinate system of the beam-directing system, the processor may verify that the distance between these coordinates and the target coordinates exceeds a predefined threshold distance. Alternatively or additionally, the processor may instruct the beam-directing system to direct a test beam of radiation at the target coordinates, and verify that the amount of radiation sensed by the radiation sensor on the catheter is less than a predefined threshold amount. Alternatively or additionally, the processor may instruct the beam-directing system to direct a test beam of radiation at the coordinates of the distal end of the catheter, and verify that the amount of radiation sensed by the radiation sensor on the catheter exceeds a predefined threshold amount.

System Description

Reference is initially made to FIG. 1, which is a schematic illustration of an example electrophysiology mapping and radiotherapy system 10, in accordance with some examples of the present disclosure. One commercial product embodying elements of system 10 is available as the CARTO™ 3 System, available from Biosense Webster, Inc., 31A Technology Drive, Irvine, CA 92618.

System 10 comprises a beam-directing system 36 configured to direct beams of radiation at tissue within the body of a patient 23. In some examples, beam-directing system 36 comprises a linear particle accelerator. The beams of radiation may be directed at cardiac tissue, as assumed in FIG. 1, or at any other tissue, such as cancerous tissue.

System 10 further comprises an intrabody catheter 14. In some examples, catheter 14 is percutaneously inserted by a physician 24 into the body of patient 23. Following the insertion of catheter 14, physician 24 may navigate the catheter through the vascular system of patient 23 into a chamber or vascular structure of the patient's heart 12. (Typically, the catheter is navigated through a delivery tube (not shown).) In other examples, the catheter is inserted by the physician into the patient's gastrointestinal track, such as into the patient's esophagus.

System 10 further comprises a tracking system for tracking the three-dimensional (3D) location (and, typically, orientation) of the distal end of the catheter. The tracking system comprises a tracking sensor 29 at or near the distal end of catheter 14.

Typically, tracking sensor 29 comprises three magnetic coils, and the tracking system further comprises a location pad 25, which comprises a plurality of magnetic coils 32 configured to generate a magnetic field in a predefined working volume. Location pad 25 is positioned near (e.g., underneath) patient 23. Based on signals induced in the coils by the magnetic field, the location and orientation of distal end of the catheter is tracked by a processor, such as any of the processors described below. Details of such magnetic-based tracking are described in U.S. Pat. Nos. 5,391,199, 5,443,489, 5,558,091, 6,172,499, 6,239,724, 6,332,089, 6,484,118, 6,618,612, 6,690,963, 6,788,967, and 6,892,091.

Alternatively or additionally, tracking sensor 29 may comprise one or more tracking electrodes, and the tracking system may further comprise one or more electrode patches 38 configured to contact the skin of patient 23. In addition to establishing a location reference for location pad 25, patches 38 may sense electrical current from the tracking electrodes, and the location of each tracking electrode may be triangulated by the processor in response thereto. Details of such impedance-based tracking technology are described in U.S. Pat. Nos. 7,536,218, 7,756,576, 7,848,787, 7,869,865, and 8,456,182.

In some examples, the distal end of catheter 14 further comprises a radiation sensor 40 configured to sense radiation from outside the body of the patient, such as radiation from beam-directing system 36, and to output a radiation-indicating signal indicating the amount of sensed radiation. In some examples, radiation sensor 40 comprises a photodiode array. Optionally, radiation sensor 40 may be one or more Si photodiode elements. One example type back-illuminated photodiode array for X-ray non-destructive inspection is the S11212 series manufactured by Hamamatsu Photonics in Shizuoka, Japan.

Alternatively or additionally, the distal end of catheter 14 may comprise a contact sensor 41 configured to output a contact-indicating signal indicating whether contact sensor 41 contacts tissue of patient 23. For example, contact sensor 41 may be an electrode or a pair of electrodes, the impedance of which is sensed and is expected to vary depending on whether the electrode(s) contact(s) the tissue. Alternatively or additionally, for example, the contact sensor may comprise a pressure sensor.

In examples in which contact sensor 41 comprises one or more electrodes, the electrodes may additionally be used for sensing intracardiac electrogram (IEGM) signals. In other examples, other electrodes may perform these functions.

System 10 further comprises a recorder 11 and a display 27. Recorder 11 is configured to record electrocardiographic (ECG) signals 21 acquired by body-surface ECG electrodes 18 and/or IEGM signals acquired by catheter 14 (or another catheter), and optionally, to display these signals on display 27. Recorder 11 may also be configured to pace heart 12 and/or may be electrically connected to a standalone pacer.

In some examples, system 10 further comprises an ablation-energy generator 50 configured to conduct ablative energy to one or more electrodes at the distal end of catheter 14 (or another catheter). Energy produced by ablation-energy generator 50 may include, but is not limited to, radiofrequency (RF) energy and/or pulsed field ablation energy, including monopolar or bipolar high-voltage direct-current (DC) pulses for effecting irreversible electroporation, or combinations thereof.

System 10 further comprises a workstation 55 comprising a processor 34, a volatile memory and/or non-volatile memory that may be loaded with appropriate software instructions, and a user interface. Processor 34 may be configured to perform multiple functions, including, for example, (1) mapping the endocardial anatomy of heart 12 in 3D and rendering the resulting anatomical map 20 for display on display 27, (2) displaying, on display 27, activation sequences and/or other data compiled from ECG signals 21 in representative visual indicia or imagery superimposed on anatomical map 20, (3) displaying the real-time location and orientation of one or more catheters within the body of patient 23, and (4) displaying sites of interest, such as sites at which ablation energy has been applied.

System 10 further comprises a patient interface unit (PIU) 30, which is configured to establish electrical communication between the catheters, electrophysiological equipment, power supplies, and workstation 55. The electrophysiological equipment may comprise, for example, location pad 25, ECG electrodes 18, electrode patches 38, ablation-energy generator 50, and/or recorder 11. Typically, PIU 30 further comprises another processor configured to compute of location and orientation of the catheters and to compute ECG signals 21.

In general, the term "processor," as used in the description and claims below, may refer to a single processor, such as processor 34, the controller of ablation-energy generator 50, or the processor of PIU 30. Alternatively, this term may refer to a cooperatively networked or clustered set of processors. For example, any of the functionality described hereinbelow may be performed cooperatively by some or all of processor 34, the controller of ablation-energy generator 50, and the processor of PIU 30.

In general, each of the processors described herein may be embodied as a single processor or as a cooperatively networked or clustered set of processors. The functionality of the processor may be implemented solely in hardware, e.g., using one or more fixed-function or general-purpose integrated circuits, Application-Specific Integrated Circuits (ASICs), and/or Field-Programmable Gate Arrays (FPGAs). Alternatively, this functionality may be implemented at least partly in software. For example, the processor may be embodied as a programmed processor comprising, for example, a central processing unit (CPU) and/or a Graphics Processing Unit (GPU). Program code, including software programs, and/or data may be loaded for execution and processing by the CPU and/or GPU. The program code and/or data may be downloaded to the processor in electronic form, over a network, for example. Alternatively or additionally, the program code and/or data may be provided and/or stored on non-transitory tangible media, such as magnetic, optical, or electronic memory. Such program code and/or data, when provided to the processor, produce a machine or special-purpose computer, configured to perform the tasks described herein.

Performing Ablative Radiotherapy

Advantageously, the processor is configured to communicate instructions to beam-directing system 36 over a wired or wireless communication interface. Furthermore, as further described below, the processor is configured to register the coordinate system of the tracking system with the coordinate system of the beam-directing system. Thus, rather than aiming the beam-directing system by entering the target coordinates manually, a user, such as physician 24, may specify target tissue within the body of patient 23 that is to be ablated, and the processor may then (i) calculate the coordinates of the target tissue in the coordinate system of the beam-directing system, and (ii) aim the beam-directing system at the calculated coordinates.

In particular, to specify the target tissue, the user may select (e.g., using a mouse or a touch screen belonging to display 27) the portion of anatomical map 20 corresponding to the target tissue. Alternatively, the user may select the portion of an image, such as a computed tomography (CT) or ultrasound image, corresponding to the target tissue. Based on a precomputed registration between the tracking system and the map or image, the processor may then calculate the coordinates of the target tissue in the coordinate system of the beam-directing system.

Alternatively, for examples in which the catheter is positioned at the target tissue (e.g., as described below with reference to FIG. 3A), the user may instruct the processor to aim the beam-directing system at the current location of the catheter. This instruction may be input, for example, by pressing a button on the handle of the catheter.

In some examples, as assumed for the remainder of the present description, the processor does not cause the beam-directing system to emit any therapeutic beams of radiation. Rather, after the processor aims the beam-directing system at the target tissue (and, possibly, as the processor continually adjusts the aiming to track movement of the target tissue), the physician (e.g., by pushing a button) initiates activation of the beam-directing system to emit one or more therapeutic beams.

In other examples, the processor does not merely aim the beam-directing system, but rather, also causes the beam-directing system to emit the therapeutic beams.

In yet other examples, the processor does not aim the beam-directing system. Rather, the processor merely displays the coordinates of the target tissue in the coordinate system of the beam-directing system, and the user then aims the beam-directing system at these coordinates.

Figure 2:
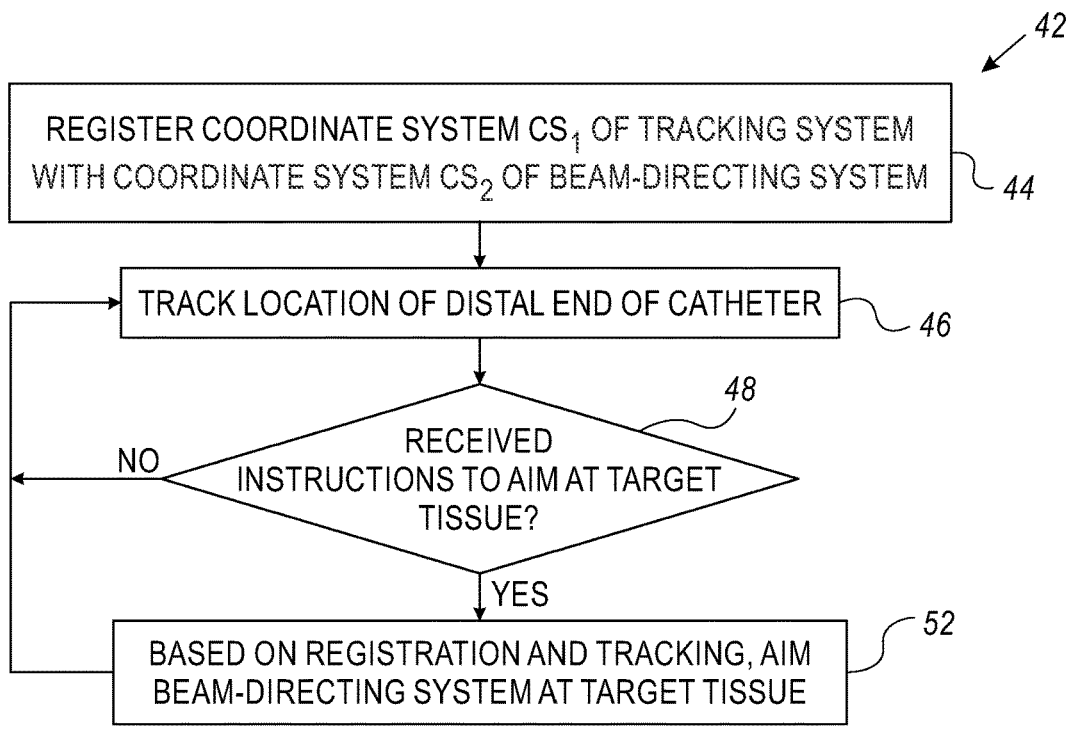
FIG. 2 is a flow diagram for a method for performing ablative radiotherapy, in accordance with some examples of the present disclosure.

For further details, reference is now additionally made to FIG. 2, which is a flow diagram for a method 42 for performing ablative radiotherapy, in accordance with some examples of the present disclosure.

Method 42 begins with a registering step 44, at which the processor registers the coordinate system $CS_1$ of the tracking system with the coordinate system $CS_2$ of beam-directing system 36 and optionally and preferably with the coordinate system of an imaging system configured for imaging the area of interest. Following the registration, while catheter 14 is within the body of patient 23, the processor, using the tracking system, tracks the location of the distal end of the catheter at a tracking step 46. In other words, the processor continually receives a signal from tracking sensor 29 and, based on the signal, computes the location of the distal end of the catheter.

At any point in time, a user, such as physician 24, may instruct the processor to aim the beam-directing system at target tissue within the body of the patient. The target tissue may be identified based on an electro-anatomical map and/or based on imaging of an area of interest. Periodically, the processor checks, at a checking step 48, whether any such instructions were received. If not, the processor continues tracking the distal end of the catheter.

In response to ascertaining, at checking step 48, that aiming instructions were received, the processor performs an aiming step 52. At aiming step 52, the processor, based on the registration and the tracking, aims the beam-directing system at the target tissue specified by the user so as to facilitate directing one or more therapeutic beams of radiation at the target tissue. Subsequently, the processor returns to tracking step 46.

Various example implementations of aiming step 52 are hereby described.

Irradiating the Target Tissue by Directing Radiation at the Catheter

In some examples, the processor aims the beam-directing system at the distal end of the catheter while the distal end of the catheter is at the target tissue.

Figure 3A:
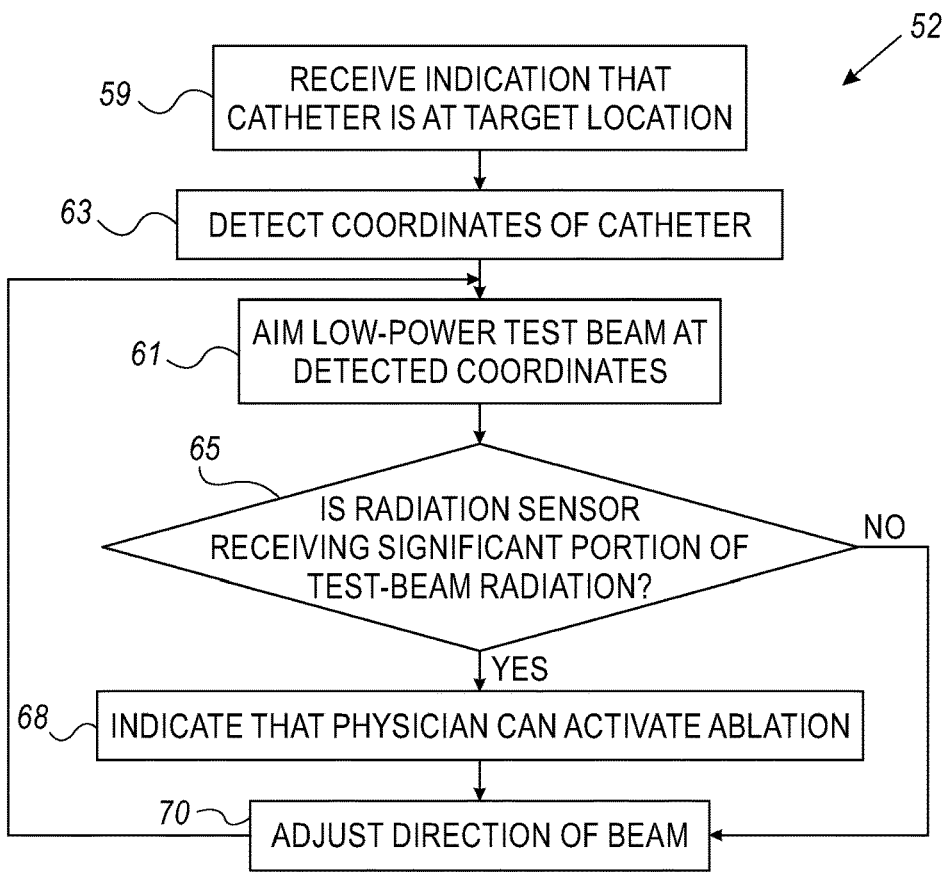
FIGS. 3A-D are flow diagrams for example implementations of an aiming step shown in FIG. 2, in accordance with some examples of the present disclosure.

In this regard, reference is now made to FIG. 3A, which is a flow diagram for an example implementation of aiming step 52, in accordance with some examples of the present disclosure.

In some examples, aiming step 52 begins with an indication-receiving step 59, at which the processor receives an indication that the catheter is at the target location. For example, after navigating the catheter to the target location, the user may input the indication to the processor, e.g., by pressing a button on the catheter handle.

As described above with reference to FIG. 1, in some examples, the distal end of the catheter comprises contact sensor 41. In such examples, based on the signal from the contact sensor, the indication that the catheter is at the target location for ablating may be provided only when the system verifies that the catheter is touching the endocardium.

Subsequently to receiving the indication, the processor, based on the tracking and the registration, detects the coordinates $C_2$ of the catheter, in the coordinate system $CS_2$ of the beam-directing system, at a detecting step 63.

As described above with reference to FIG. 1, in some examples, the distal end of the catheter includes radiation sensor 40. In such examples, the processor uses radiation sensor 40 to verify that the registration is correct (and hence, that $C_2$ is detected correctly) before aiming the beam-directing system at $C_2$ for delivery of the therapeutic radiation.

In particular, the processor aims a low-power test beam of radiation, which has an intensity less than that of the therapeutic beams of radiation, at the detected coordinates, at an aiming step 61. Subsequently, at a checking step 65, the processor checks whether the radiation sensor is receiving a significant portion of the test-beam radiation. If yes, the processor indicates, at an indicating step 68, that the physician can activate the ablation. Otherwise, the processor performs an adjusting step 70, at which the processor adjusts the direction of the beam, and then returns to aiming step 61.

In other examples, the processor proceeds from detecting step 63 directly to indicating step 68.

It is noted that during the execution of aiming step 52, the position of the catheter may be continuously monitored to accommodate for any movement of the catheter, in that the direction of the beam may be coordinated with the current location of the catheter.

Using the Catheter to Protect Other Tissue

In other examples, the processor aims the beam-directing system at the target tissue while the distal end of the catheter is not at the target tissue, but rather, is at a particular area the physician wishes to avoid ablating. For example, for cases in which the target tissue is in the patient's heart, the distal end of the catheter may be positioned in the patient's esophagus.

In such examples, based on the registration of the two coordinate systems and on the tracking of the distal end of the catheter, the processor may verify that a therapeutic beam directed at the target coordinates (i.e., the coordinates of the target tissue in $CS_2$ that were calculated by the processor in response to the user's instructions to aim at the target tissue) would not impinge on the particular area that the physician wishes to avoid ablating. For this purpose, a test beam may be directed to the target location concurrently with sensing radiation with a radiation sensor positioned on the catheter that is placed at the particular area. If the sensed radiation is below a defined threshold, the processor provides an indication that it is safe to ablate. Alternatively, the test beam may be directed toward the catheter placed at the particular area, and if the radiation detected is above a defined threshold (indicating that the beam is directed at the particular area), that particular beam direction is stored as a beam direction at which ablation is to be avoided.

In response thereto, the processor may aim the beam-directing system at the target coordinates.

Figure 3B:
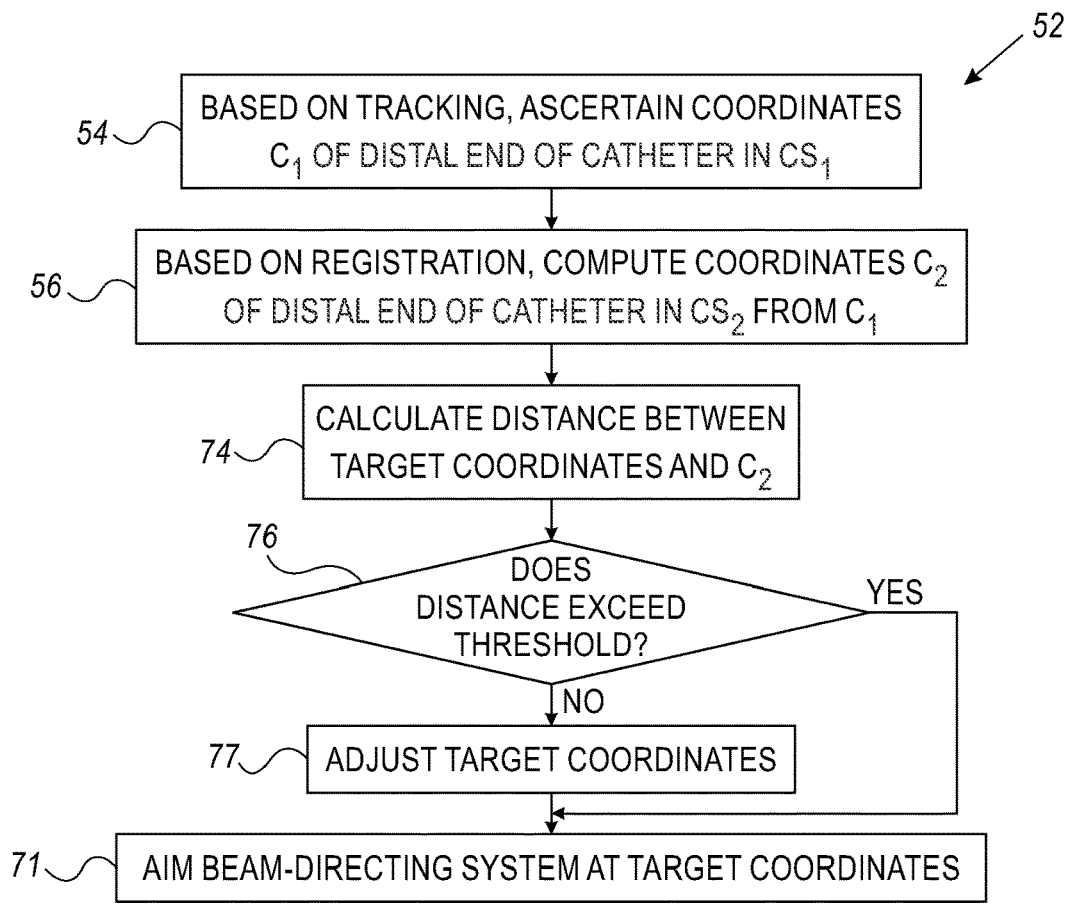
Figure 3C:
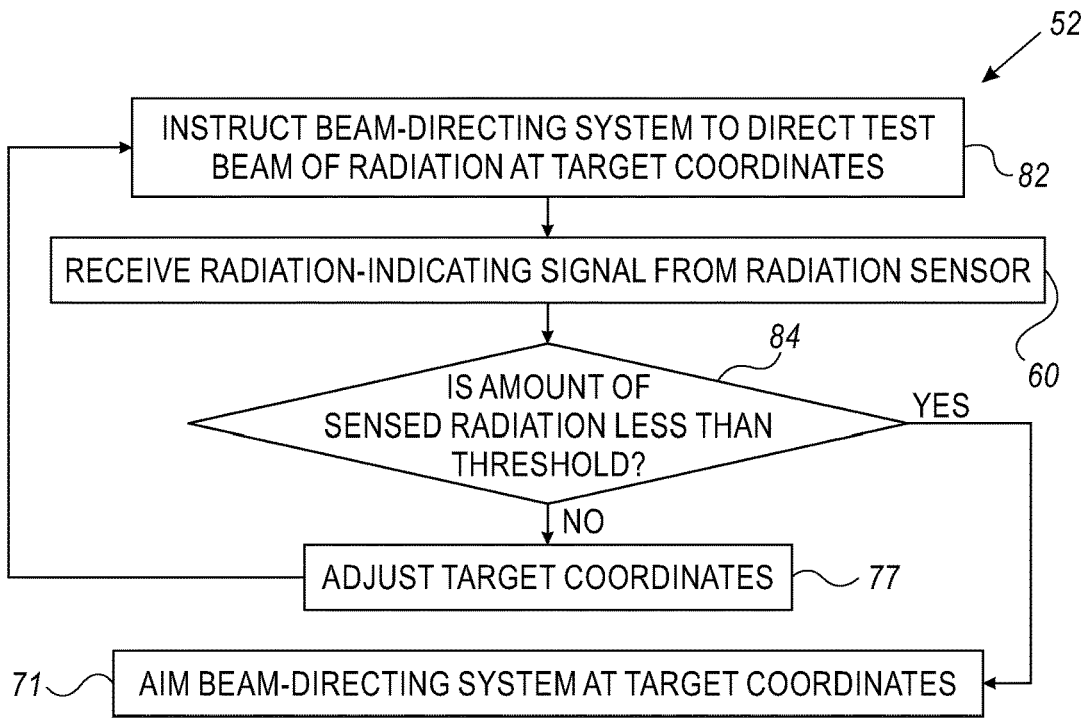
Figure 3D:
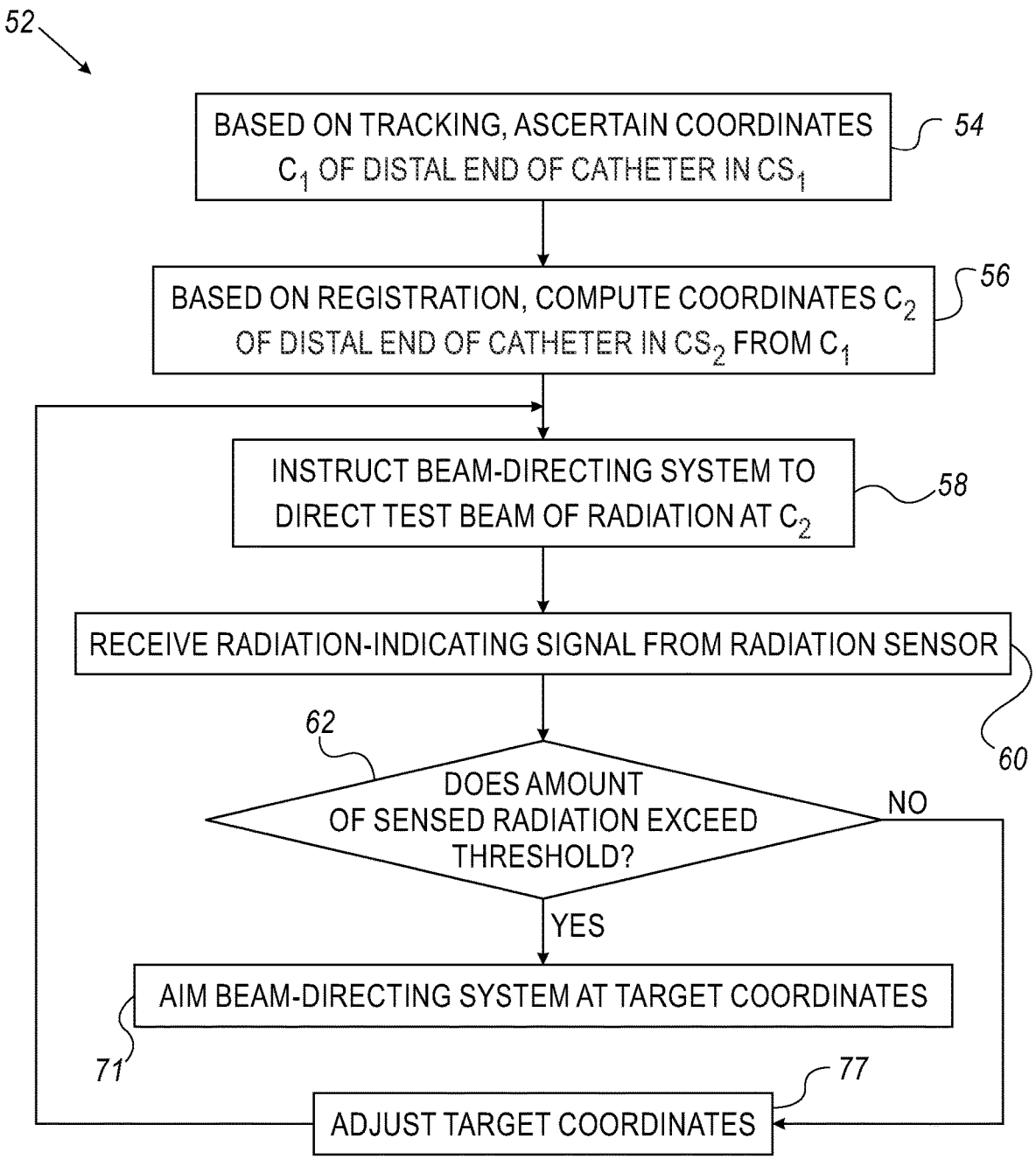

FIGS. 3B-D, which are flow diagrams for other example implementations of aiming step 52 in accordance with some examples of the present disclosure, show various methods for performing this verification. First, reference is made to FIG. 3B.

Based on the tracking, the processor, at an ascertaining step 54, ascertains the coordinates $C_1$ of the distal end of the catheter in $CS_1$, the coordinate system of the tracking system. Subsequently, at a computing step 56, the processor, based on the registration, computes, from $C_1$, the coordinates $C_2$ of the distal end of the catheter in $CS_2$, the coordinate system of the beam-directing system.

Next, the processor, at a distance-calculating step 74, calculates the distance between the target coordinates and $C_2$. Subsequently, the processor checks, at another checking step 76, whether the distance exceeds a predefined threshold distance. If not, the processor adjusts the target coordinates at an adjusting step 77, by moving the target coordinates so that the distance exceeds the threshold. Subsequently, or if the distance initially exceeds the threshold, the processor aims the beam-directing system at the target coordinates at an aiming step 71.

Reference is now made to FIG. 3C.

In some examples in which the distal end of the catheter comprises radiation sensor 40 (FIG. 1), the processor instructs the beam-directing system, at another instructing step 82, to direct a test beam of radiation at the target coordinates. (As in FIG. 3A, the test beam has an intensity less than that of the therapeutic beams of radiation.) Subsequently to receiving a radiation-indicating signal from the radiation sensor at a signal-receiving step 60, the processor checks, at another checking step 84, whether the amount of radiation sensed by the radiation sensor is less than a predefined threshold amount. If not, the processor adjusts the target coordinates at an adjusting step 77 and then returns to instructing step 82. Otherwise, the processor performs aiming step 71.

Reference is now made to FIG. 3D.

Similarly to FIG. 3C, FIG. 3D relates to a case in which the distal end of the catheter comprises radiation sensor 40 (FIG. 1).

First, the processor performs ascertaining step 54 and computing step 56. Next, the processor instructs the beam-directing system, at an instructing step 58, to direct a test beam of radiation, which has an intensity less than that of the therapeutic beams of radiation, at $C_2$. The processor then performs signal-receiving step 60 and checking step 62.

If the amount of sensed radiation does not exceed the predefined threshold amount, the processor performs adjusting step 77, by applying the same offset to both $C_2$ and the target coordinates. Subsequently, the processor returns to instructing step 58.

Otherwise, the processor performs aiming step 71.

It is noted that the methods of FIGS. 3B-D may be performed in combination with each other, i.e., the processor may perform multiple verifications before the therapeutic beams are emitted.

EXAMPLES

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A method for performing ablative radiotherapy, the method comprising: registering a first coordinate system of a tracking system (25, 29, 30, 32, and 38), which is configured to track a location of a distal end of an intrabody catheter (14) within a body of a patient (24), with a second coordinate system of a beam-directing system (36), which is configured to direct therapeutic beams of radiation into the body of the patient (24) from outside the body; using the tracking system (25, 32, 38 and 29), tracking the location of the distal end of the catheter (14); receiving instructions from a user to ablate target tissue within the body; and in response to the instructions, based on the registration and the tracking, aiming the beam-directing system (36) at the target tissue so as to facilitate directing the therapeutic beams of radiation at the target tissue.

Example 2

The method according to example 1, wherein aiming the beam-directing system (36) at the target tissue comprises aiming the beam-directing system (36) at the target tissue by aiming the beam-directing system (36) at the distal end of the catheter (14) while the distal end of the catheter (14) is at the target tissue.

Example 3

The method according to any one of example 1 and example 2, wherein aiming the beam-directing system (36) at the distal end of the catheter (14) comprises: based on the tracking, ascertaining first coordinates of the distal end of the catheter (14) in the first coordinate system while the distal end of the catheter is at the target tissue; based on the registration, computing, from the first coordinates, second coordinates of the distal end of the catheter in the second coordinate system; and aiming the beam-directing system (36) at the second coordinates.

Example 4

The method according to any one of examples 1-3, wherein the distal end of the catheter (14) includes a radiation sensor (40) configured to output a radiation-indicating signal indicating an amount of radiation sensed by the radiation sensor (40), wherein the method further comprises instructing the beam-directing system (36) to direct a test beam of radiation, which has an intensity less than that of the therapeutic beams of radiation, at the second coordinates, and wherein aiming the beam-directing system at the second coordinates comprises: receiving the radiation-indicating signal; and aiming the beam-directing system (36) at the second coordinates in response to the amount of radiation exceeding a predefined threshold amount.

Example 5

The method according to any one of examples 1-3, wherein the distal end of the catheter (14) includes a contact sensor (41) configured to output a contact-indicating signal indicating whether the contact sensor contacts tissue, wherein the method further comprises receiving the contact-indicating signal, and wherein aiming the beam-directing system (36) at the second coordinates comprises aiming the beam-directing system (36) at the second coordinates in response to the contact-indicating signal indicating that the contact sensor (41) contacts tissue.

Example 6

The method according to any one of examples 2-5, wherein the aiming at the distal end of the catheter (14) compensates for movement of the target tissue between emissions of the therapeutic beams, by virtue of the distal end of the catheter (14) moving together with the target tissue.

Example 7

The method according to any one of examples 2-5, wherein the aiming at the distal end of the catheter (14) compensates for movement of the target tissue while a single one of therapeutic beams is emitted, by virtue of the distal end of the catheter (14) moving together with the target tissue.

Example 8

The method according to any one of examples 1-7, further comprising using the tracking system (25, 29, 30, 32, and 38) to track the location of a distal end of a second catheter (14); wherein the distal end of the second catheter (14) is not at the target tissue, and wherein aiming the beam-directing system at the target tissue comprises: based on the registration and the tracking, verifying that any one of the therapeutic beams directed at calculated coordinates of the target tissue in the second coordinate system would not impinge on the distal end of the second catheter (14); and in response to the verifying, aiming the beam-directing system (36) at the calculated coordinates of the target tissue.

Example 9

The method according to any one of example 1-8, wherein the target tissue is in a heart (12) of the patient (23), and wherein the distal end of the second catheter (14) is in an esophagus of the patient (23).

Example 10

The method according to any one of example 8 and example 9, wherein the verifying comprises: based on the tracking, ascertaining first coordinates of the distal end of the second catheter (14) in the first coordinate system; based on the registration, computing second coordinates of the distal end of the second catheter (14) in the second coordinate system from the first coordinates; calculating a distance between the calculated coordinates of the target tissue and the second coordinates of the distal end of the second catheter; and verifying that the distance exceeds a predefined threshold distance.

Example 11

The method according to any one of examples 8-10, wherein the distal end of the second catheter (14) includes a radiation sensor (40), and wherein the verifying comprises: instructing the beam-directing system (36) to direct a test beam of radiation, which has an intensity less than that of the therapeutic beams of radiation, at the calculated coordinates; receiving, from the radiation sensor (40), a radiation-indicating signal indicating an amount of radiation sensed by the radiation sensor (40); and verifying that the amount of radiation is less than a predefined threshold amount.

Example 12

A system for performing ablative radiotherapy comprising: a tracking system (25, 29, 30, 32, and 38) configured to track three-dimensional (3D) location of a distal end of a catheter (14) while the distal end is inserted into a heart chamber, wherein the location is tracked within a first coordinate system defined by the tracking system (25, 29, 30, 32, and 38); a beam-directing system (36) configured to direct therapeutic beams of radiation into a heart chamber of a patient (23) from outside the patient (23), wherein the therapeutic beams is directed according to second coordinate system associated with the beam-directing system; and a processor (34) configured to: receive first instructions for ablating a target location defined in the first coordinate system, wherein the target location is a location of the distal end that is tracked with the tracking system; generate second instructions for directing the therapeutic beams to the target location, wherein the second instructions are defined based the second coordinate system; and direct the second instructions to the beam-directing system (36) for ablating tissue at the target location.

Example 13

The system according to example 12, wherein the beam-directing system (36) is configured to direct a test beam of radiation into a heart chamber of the patient (23) from outside the patient (23), wherein the test beam is configured to be non-therapeutic.

Example 14

The system according to example 13, wherein the processor (34) is configured confirm that the test beam is directed to the target location based on output received from a radiation sensor (40) mounted at the distal end of the catheter (14).

Example 15

The system according to example 13, wherein the tracking system (25, 29, 30, 32, and 38) is configured to track a second location of a second catheter and wherein the processor (34) is configured to store the second location and generate an alert if the test beam is directed toward the second location.

Example 16

The system according to example 15, wherein the processor (34) is configured to confirm that the test beam is directed away from the second location based on output received from a second radiation sensor (40) mounted on the second catheter (14).

It will be appreciated by persons skilled in the art that the present disclosure is not limited to what has been particularly shown and described hereinabove. Rather, the scope of the present disclosure includes both combinations and sub-combinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for performing ablative radiotherapy, the method comprising:
registering a first coordinate system of a tracking system, which is configured to track a location of a distal end of an intrabody catheter within a body of a patient, with a second coordinate system of a beam-directing system, which is configured to direct therapeutic beams of radiation into the body of the patient from outside the body, the distal end of the catheter including a contact sensor configured to provide an indication of contact between the contact sensor and tissue of the patient;
using the tracking system, tracking the location of the distal end of the catheter;
receiving a signal from the contact sensor indicative of contact between the contact sensor and the tissue; and
based at least in part on the registration, the tracking, and the signal, aiming the beam-directing system at target tissue within the body so as to facilitate directing the therapeutic beams of radiation at the target tissue.

2. The method according to claim 1, wherein aiming the beam-directing system at the target tissue comprises aiming the beam-directing system at the target tissue by aiming the beam-directing system at the distal end of the catheter while the distal end of the catheter is at the target tissue.

3. The method according to claim 2, wherein aiming the beam-directing system at the distal end of the catheter comprises:
based on the tracking, ascertaining first coordinates of the distal end of the catheter in the first coordinate system while the distal end of the catheter is at the target tissue;
based on the registration, computing, from the first coordinates, second coordinates of the distal end of the catheter in the second coordinate system; and
aiming the beam-directing system at the second coordinates.

4. The method according to claim 3,
wherein the distal end of the catheter includes a radiation sensor configured to output a radiation-indicating signal indicating an amount of radiation sensed by the radiation sensor,
wherein the method further comprises instructing the beam-directing system to direct a test beam of radiation, which has an intensity less than that of the therapeutic beams of radiation, at the second coordinates, and
wherein aiming the beam-directing system at the second coordinates comprises:
receiving the radiation-indicating signal; and
aiming the beam-directing system at the second coordinates in response to the amount of radiation exceeding a predefined threshold amount.

5. The method according to claim 2, wherein the aiming at the distal end of the catheter compensates for movement of the target tissue between emissions of the therapeutic beams, by virtue of the distal end of the catheter moving together with the target tissue.

6. The method according to claim 2, wherein the aiming at the distal end of the catheter compensates for movement of the target tissue while a single one of therapeutic beams is emitted, by virtue of the distal end of the catheter moving together with the target tissue.

7. The method according to claim 1, further comprising using the tracking system to track the location of a distal end of a second catheter;
wherein the distal end of the second catheter is not at the target tissue, and wherein aiming the beam-directing system at the target tissue comprises:
based on the registration and the tracking, verifying that any one of the therapeutic beams directed at calculated coordinates of the target tissue in the second coordinate system would not impinge on the distal end of the second catheter; and
in response to the verifying, aiming the beam-directing system at the calculated coordinates of the target tissue.

8. The method according to claim 7, wherein the target tissue is in a heart of the patient, and wherein the distal end of a second catheter is in an esophagus of the patient.

9. The method according to claim 7, wherein the verifying comprises:
based on the tracking, ascertaining first coordinates of the distal end of the second catheter in the first coordinate system;
based on the registration, computing second coordinates of the distal end of the second catheter in the second coordinate system from the first coordinates;
calculating a distance between the calculated coordinates of the target tissue and the second coordinates of the distal end of the second catheter; and
verifying that the distance exceeds a predefined threshold distance.

10. The method according to claim 7,
wherein the distal end of the second catheter includes a radiation sensor, and wherein the verifying comprises:
instructing the beam-directing system to direct a test beam of radiation, which has an intensity less than that of the therapeutic beams of radiation, at the calculated coordinates;
receiving, from the radiation sensor, a radiation-indicating signal indicating an amount of radiation sensed by the radiation sensor; and
verifying that the amount of radiation is less than a predefined threshold amount.

11. A system for performing ablative radiotherapy comprising:
a tracking system configured to track three-dimensional (3D) location of a distal end of a catheter while the distal end is inserted into a heart chamber, wherein the location is tracked within a first coordinate system defined by the tracking system;
a beam-directing system configured to direct therapeutic beams of radiation into the heart chamber of a patient from outside the patient, wherein the therapeutic beams is directed according to second coordinate system associated with the beam-directing system; and
a processor configured to:
receive first instructions for ablating a target location defined in the first coordinate system, wherein the target location is a location of the distal end that is tracked with the tracking system;
generate second instructions for directing the therapeutic beams to the target location, wherein the second instructions are defined based the second coordinate system; and
direct the second instructions to the beam-directing system for ablating tissue at the target location,
wherein the beam-directing system is configured to direct a test beam of radiation into a heart chamber of a patient from outside the patient, wherein the test beam is configured to be non-therapeutic.

12. The system according to claim 11, wherein the processor is configured confirm that the test beam is directed to the target location based on output received from a radiation sensor mounted at the distal end of the catheter.

13. The system according to claim 11, wherein the tracking system is configured to track a second location of a second catheter and wherein the processor is configured to store the second location and generate an alert if the test beam is directed toward the second location.

14. The system according to claim 13, wherein the processor is configured to confirm that the test beam is directed away from the second location based on output received from a second radiation sensor mounted on the second catheter.

* * * * *